(12) United States Patent
Momoki

(10) Patent No.: US 9,841,597 B2
(45) Date of Patent: Dec. 12, 2017

(54) ANTI-REFLECTION FILM, OPTICAL ELEMENT INCLUDING THE SAME, AND OPTICAL SYSTEM

(71) Applicant: CANON KABUSHIKI KAISHA, Tokyo (JP)

(72) Inventor: Kazuhiko Momoki, Koshigaya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 247 days.

(21) Appl. No.: 14/677,108

(22) Filed: Apr. 2, 2015

(65) Prior Publication Data
US 2015/0293267 A1    Oct. 15, 2015

(30) Foreign Application Priority Data

Apr. 11, 2014  (JP) ................. 2014-081827

(51) Int. Cl.
*G02B 1/11*    (2015.01)
*G02B 27/00*   (2006.01)
*G02B 1/118*   (2015.01)

(52) U.S. Cl.
CPC .......... *G02B 27/0018* (2013.01); *G02B 1/118* (2013.01)

(58) Field of Classification Search
CPC .. G02B 1/11–1/18; G02B 5/02–5/0294; G02B 5/28–5/289
USPC .................................................. 359/577–590
See application file for complete search history.

(56) References Cited

U.S. PATENT DOCUMENTS

| | | | | |
|---|---|---|---|---|
| 4,313,647 A * | 2/1982 | Takazawa | ............. | G02B 1/115 359/581 |
| 4,370,027 A * | 1/1983 | Sato | ............. | G02B 1/115 359/588 |
| 5,532,871 A * | 7/1996 | Hashimoto | ............. | G02B 1/115 359/359 |
| 6,574,039 B1 * | 6/2003 | Murata | ............. | B82Y 10/00 355/67 |
| 7,791,803 B2 * | 9/2010 | Terayama | ............. | G02B 1/115 359/570 |
| 8,125,714 B2 | 2/2012 | Yamada et al. | | |
| 8,199,404 B2 * | 6/2012 | Yamada | ............. | G02B 1/115 359/581 |

(Continued)

FOREIGN PATENT DOCUMENTS

| | | |
|---|---|---|
| JP | 2009-157264 A | 7/2009 |
| JP | 2009-168852 A | 7/2009 |
| JP | 2009-230121 A | 10/2009 |

*Primary Examiner* — Bumsuk Won
*Assistant Examiner* — Jeffrey Madonna
(74) *Attorney, Agent, or Firm* — Carter, DeLuca, Farrell & Schmidt, LLP

(57) ABSTRACT

Provided is an anti-reflection film, which is formed on substrate, the anti-reflection film having a laminated layer structure including, in order from the substrate: a first layer to a sixth layer each formed of a dielectric thin film; and a seventh layer formed by a wet process, in which the first to the sixth layers are formed of three kinds of mediums having different refractive indices from one another, and in which, when refractive indices of the three kinds of mediums at wavelength of 550 nm are defined as nL, nM, and nH, the first layer is formed of a medium having nM, the sixth layer is formed of a medium having nH, a layer formed of a medium having nL and a layer formed of a medium having off are spaced away from each other, and nL, nM, and nH are appropriately set.

11 Claims, 10 Drawing Sheets

(56) References Cited

U.S. PATENT DOCUMENTS

| | | | |
|---|---|---|---|
| 2007/0159697 A1* | 7/2007 | Terayama | G02B 27/0012 359/586 |
| 2010/0027123 A1* | 2/2010 | Imai | G02B 1/115 359/586 |
| 2014/0009835 A1* | 1/2014 | Shibuya | G02B 1/111 359/586 |
| 2015/0009570 A1* | 1/2015 | Amano | G02B 1/11 359/601 |

* cited by examiner

ANTI-REFLECTION FILM, OPTICAL ELEMENT INCLUDING THE SAME, AND OPTICAL SYSTEM

BACKGROUND OF THE INVENTION

Field of the Invention

The present invention relates to an anti-reflection film, an optical element including the same, and an optical system.

Description of the Related Art

An anti-reflection film has hitherto been formed on surfaces of an image capturing lens to be used in an image pickup apparatus such as a video camera, photographic camera, or a television camera, in order to increase an amount of transmitted light and avoid ghost, flare, and the like caused by unnecessary light. The anti-reflection film often includes a multi-layer film in which a plurality of dielectric thin films are laminated.

In general, as the anti-reflection film has a larger number of layers laminated therein, its reflection preventing effect becomes higher. It is also effective for the anti-reflection film to use as its outermost layer (uppermost layer) a low-refractive-index layer in order to obtain a high reflection preventing effect. As such low-refractive-index layer, there has been known a so-called porous layer, in which fine pores each having a size equal to or less than a wavelength of light are incorporated into a medium containing $SiO_2$ (silica), $MgF_2$ (magnesium fluoride), or the like. Such porous layer can achieve a substantial reduction in refractive index depending on an air ratio in the medium. When the porous layer has a pore ratio of about 50%, the layer can realize a refractive index of about 1.25. An anti-reflection film using such porous layer has hitherto been known (Japanese Patent Application Laid-Open No. 2009-157264).

Japanese Patent Application Laid-Open No, 2009-157264 discloses an anti-reflection film using as its uppermost layer a porous layer containing as a main component of and having a refractive index of 1.270. Specifically, the anti-reflection film has a structure in which seven layers are laminated on a substrate, and in which, from a substrate side, a layer containing as a main component alumina is formed as a first layer, and high-refractive-index layers having refractive indices of 1.95 or more and 2.25 or less and low-refractive-index layers having refractive indices of 1.35 or more and 1.50 or less are alternately laminated as a second and the following layers. Then, the porous layer (very-low-refractive-index layer) having a refractive index of 1.270 is disposed thereon as the uppermost layer. Thus, a high-performance reflection preventing effect of a reflectivity of 0.3% or less at a wavelength of 550 nm and a reflectivity of 0.6 or more and 1.3% or less at a wavelength of 700 nm is obtained.

The anti-reflection film disclosed in Japanese Patent Application Laid-Open. No 2009-157264 has low reflectivity as compared to related-art anti-reflection films each using $SiO_2$, $MgF_2$ or the like for its outermost layer. However, its reflectivity in a wide wavelength range is not always enough for an anti-reflection film for an image capturing lens in recent years. For example, in order to effectively avoid ghost based on reflection at a sensor surface, ghost based on reflection at a total reflection surface, and the like, the reflectivity required to be reduced in a wide wavelength range.

In order to reduce the reflectivity in a wide wavelength range and thus achieve a good reflection preventing function, it is important to appropriately set configurations such as the number of dielectric thin film layers formed on the substrate, the refractive indices of the respective layers, and the low-refractive-index layer as the uppermost layer. When such configurations are inappropriate, it is difficult to achieve a good reflection preventing effect in a wide wavelength range.

SUMMARY OF THE INVENTION

An object of the present invention is to provide an anti-reflection film exhibiting good reflection preventing performance in a wide wavelength range, an optical element including the anti-reflection film, and an optical system.

According to one embodiment of the present invention, there is provided an anti-reflection film, which is formed on a substrate, the anti-reflection film having a laminated layer structure including, in order from the substrate a first layer to a sixth layer each formed of a dielectric thin film; and a seventh layer formed by a wet process, in which the first layer to the sixth layer are formed of three kinds of mediums having different refractive indices from one another, and in which, when refractive indices of the three kinds of mediums at wavelength of 550 nm are defined as nL, nM, and nH, the first layer is formed of a medium having a refractive index of nM, the sixth layer is formed of a medium having a refractive index of nH, a layer formed of a medium having a refractive index hi nL and a layer formed of a medium having a refractive index of nH are spaced away from each other, and the refractive indices nL, nM, and nH satisfy the following conditional expressions.

$1.35 \leq nL \leq 1.50$ $1.40 \leq nM \leq 1.65$ $1.6 \leq nH \leq 2.2$ $nL < nM < nH$ Further features of the present invention will become apparent from the following description of exemplary embodiments with reference to the attached drawings.

DESCRIPTION OF THE EMBODIMENTS

Preferred embodiments of the present invention are hereinafter described with reference to the attached drawings. An anti-reflection film of the present invention is for example, an anti-reflection film to be formed on a substrate of an optical element, such as a lens or a filter to be used in an image capturing lens. The anti-reflection film has a laminated layer structure including, in order from the substrate: a first layer to a sixth layer each formed of a dielectric thin film; and a seventh layer formed by a wet process. The first layer to the sixth layer are each formed of one medium selected from three kinds of mediums having different refractive indices from one another.

Figure 1:
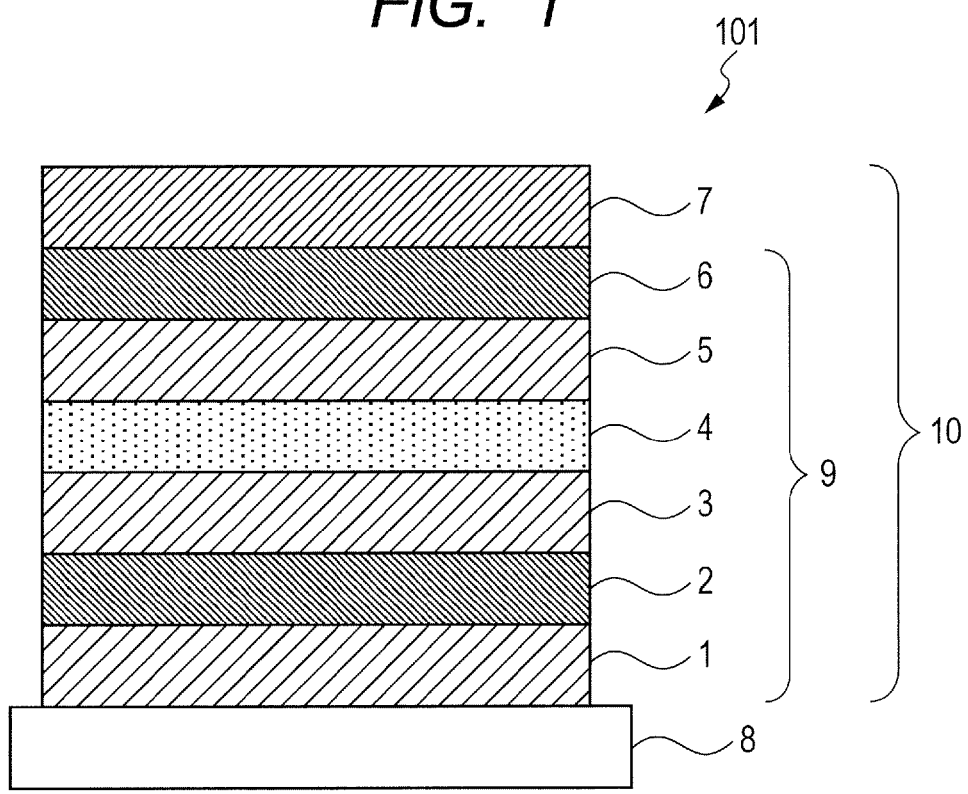
FIG. 1 is a schematic view of an anti-reflection film according to each of Examples 1 to 4 of the present invention.
Figure 7:
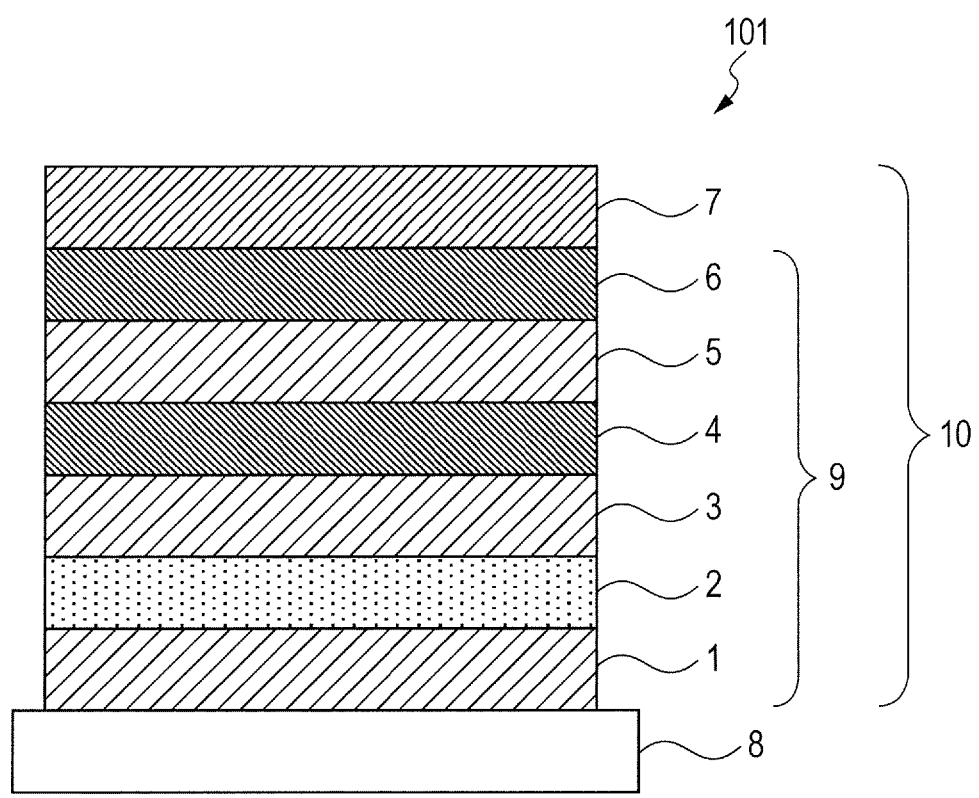
FIG. 7 is a schematic view of an anti-reflection film according to each of Examples 5 and 6 of the present invention.

FIG. 1 is a conceptual schematic view of an anti-reflection film according to each of Examples 1 to 4 of the present invention. FIG. 7 is a conceptual schematic view of an anti-reflection film according to each of Examples 5 and 6 of the present invention. An anti-reflection film 10 of each of Examples includes seven layers lemma ted on a light incident surface of a substrate 8. As the seven layers, a first layer 1, a second layer 2, a third layer 3, . . . and a seventh layer 7 are laminated in this order from a substrate 8 side.

An optical element 101 includes the substrate 8 and the anti-reflection film 10. The first layer 1 to the sixth layer 6 are each formed of a dielectric thin film formed by vapor deposition. A multi-layer film 9 is formed by vapor deposition or sputtering. The manufacturing can be performed by a technology equivalent to a conventional technology for manufacturing the anti-reflection film.

In addition, the seventh layer 7 is a very-low-refractive-index layer (porous layer) (hollow particle-containing layer) formed by a wet process.

Figure 2:
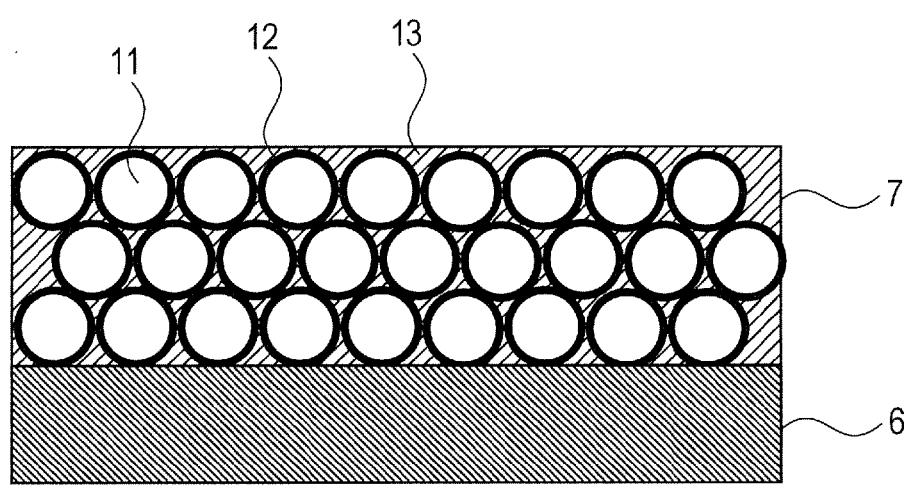
FIG. 2 is a schematic view illustrating a state in which hollow particles are arranged, and filling with a binder.

FIG. 2 is a schematic view illustrating the seventh layer 7 as a very-low-refractive-index layer (hollow particle-containing layer) of FIGS. 1 and 7. The seventh layer 7 as a very-low-refractive-index layer includes a plurality of hollow particles 12, and the hollow particles 12 are each formed of hollow silica having an internal void 11. Besides, the seventh layer 7 has a structure of a hollow particle-containing layer in which a binder (dielectric material) 13 is filled into a space between the plurality of hollow particles 12. The very-low-refractive-index layer has as low a refractive index as 1.3 or less, which is difficult to realize with an ordinary dielectric material medium, by virtue of the internal void 11.

The hollow particles 12 are each spherical or substantially spherical, and contain as its main component silica ($SiO_2$) or $MgF_2$. Herein, the "main component" refers to a material contained at a weight ratio of 50% or more shell portion formed of silica or $MgF_2$ has a thickness of about from 2 nm to 8 nm, and the hollow particles 12 each have a diameter of about from 30 nm to 60 nm. Regarding the size the hollow particles 12, the diameter is preferably 60 nm or less, and a smaller diameter is more preferred in consideration of scattered light. It should be noted that, when the shell cannot be thinned, the diameter has its limit at about 30 nm, because the hollow particles 12 each need to have an internal void ratio V of about 60% in order to achieve a low refractive index.

In the case of using silica (refractive index: 1.46), it is necessary to set an air content ratio to about 50% for realizing a refractive index of 1.25. When the hollow particles 12 are arranged in a close-packed state, the space filling ratio of the hollow particles 12 is about 74%. On the assumption that the remaining 26% is entirely filled with the binder 13, the hollow particles 12 each need to have a void ratio of about 68%.

The hollow particles 12 are mixed with a solvent, and then the mixture is formed into a film by a spin coating method or a dip coating method. At this time, the mixture is formed into a film under a state in which the hollow particles 12 are arranged by adjusting and optimizing the concentration of the solvent and application conditions. As illustrated in FIG. 2, the hollow particles 12 are arranged in a close-packed state in a narrow region. Depending on the application conditions, the hollow particles 12 are self-arranged to achieve an ordered arrangement. The hollow particles 12 each having a diameter of 60 nm or less do not diffract visible light, but when randomly arranged, cause the light to be scattered. The scattered light can reduced by increasing an arrangement degree. The arranged hollow particles 12 have a laminated structure of about two to three layers.

Further, the binder 13 containing silica or the like is produced by a sol-gel method, and is filled in the space between the hollow particles 12 to bond the hollow particles 12 to each other, as illustrated in FIG. 2. Thus, a structure having a fixed arrangement and thus ensuring strength is achieved. After being applied, the hollow particles 12 need to be bonded to each other with the binder 13. By using a spin coating method or the like, a solution of the binder 13 is applied to an element after the application of the hollow particles 12 by a sol-gel method, and then dried. After the drying, firing is performed to achieve higher binding.

For the drying and, the firing, a dryer, a hot plate, an electric furnace, or the like may be used. The firing is generally preferably performed at a temperature of 300° C. or less. The application is generally preferably performed once, but the drying and application may be repeated a plurality of times. The mediums are defined as a medium L, a medium N, and a medium H in ascending order of refractive index.

In each of Examples 1 to 4, the layers constituting the multi-layer film 9 of the anti-reflection film 10 are each formed of one medium selected from the three kind of mediums of the medium L, the medium N, and the medium H. The first layer 1, which is brought into contact with the substrate 8, is formed of the medium N, and the sixth layer 6, which is brought into contact with the seventh layer 7 serving as a very-low-refractive-index layer, is formed of the medium H. The second layer 2 to the fifth layer 5 formed therebetween have hitherto had a structure in which the medium N and the medium H are alternately laminated.

In contrast, in the anti-reflection film 10 of the present invention, only one of the layers formed of the medium H in the middle is replaced by one formed of the medium L. Specifically, the mediums are in the order of N, H, M, L, M, and H from the substrate 8. It is well known that the anti-reflection film 10 exhibits good performance when a very-low-refractive-index layer is disposed as its uppermost layer (the seventh layer in this case). However, the conventional structure in which the medium M (L) and the medium H are alternated is not enough to correct fine ripple in spectral reflectivity caused in that case. When the medium L, which has a small difference in refractive index from the medium M, is used, the reflectivity at an interface between the medium M and the medium L becomes relatively low, which facilitates the correction of fine ripple in spectral reflectivity by use of the interface for interference.

In the anti-reflection film of each of Examples, when the refractive indices of the three kinds of mediums at a wavelength of 550 nm are defined as nL, nM, and nH, the first layer is formed of a medium having a refractive index of nM, the sixth layer is formed of a medium having a refractive index of nH, and a layer formed of a medium having a refractive index of nL and a layer formed of a medium having a refractive index of nH are laminated so that those layers are prevented from being brought into contact with each other. The refractive indices nL, nM, and nH satisfy the following conditional expressions, $1.35 \leq nL \leq 1.50$ $1.40 \leq nM \leq 1.65$ $1.6 \leq nH \leq 2.2$ $nL < nM < nH$ Specific configurations of Examples 1 to 4 are hereinafter described. It should be noted that the following configurations are only illustrative, and Examples of the present invention are not limited to those satisfying the following conditions. In the anti-reflection film 10 of each of Examples 1 to 4 illustrated in FIG. 1, the refractive indices of the mediums for forming the first layer to the seventh layer are respectively defined as n1 to n7, and the optical thicknesses of the first layer to the seventh layer are respectively defined as d1 to d7.

In this case, the following conditional expressions are satisfied.

$n1 = nM, 10 \leq d1 \leq 180$ $n2 = nH, 5 \leq d2 \leq 80$ $n3 = nM, 5 \leq d3 \leq 95$ $n4 = nL, 20 \leq d4 \leq 100$ $n5 = nM, 5 \leq d5 \leq 75$ $n6 = nH, 5 \leq d6 \leq 65$ $1.1 \leq n7 \leq 1.3$ $130 \leq d7 \leq 160$ Next, anti-reflection films of Examples 1 to 4 are described.

Example 1

An anti-reflection film of Example 1 of the present invention is described. The anti-reflection film 10 of Example 1 has a structure in which seven layers of the first layer 1 to the seventh layer 7 are laminated on the substrate 8 made of glass having a refractive index of 1.52 (the refractive index and the optical thickness hereinafter refer to values at λ=550 nm).

Table 1 shows design values of the refractive indices and optical thicknesses (thickness×refractive index) for the respective layers of the anti-reflection film of Example 1. As illustrated in FIG. 1 the multi-layer film 9 including the first layer 1 to the sixth layer 6 each formed of a dielectric thin film is disposed on the substrate 8. Those dielectric thin films are formed by a vacuum vapor deposition method or a sputtering method.

The seventh layer 7 is a very-low-refractive-index porous layer as illustrated in FIG. 2. The seventh layer 7 is a hollow particle-containing layer in which the hollow particles 12 each formed of $SiO_2$ are arranged and the binder 13 is filled into a space between the particles. The hollow particles 12 have an average diameter of about 40 nm, and each have the internal void 11. The hollow particles 12 are laminated nearly in a close-packed state. The binder 13 mainly containing $SiO_2$ is filled in the space between the hollow particles 12. The seventh layer 7 has a refractive index of about 1.25. After the binder is applied, heating is performed in an oven, and thus more enhanced strength is achieved.

Figure 3A:
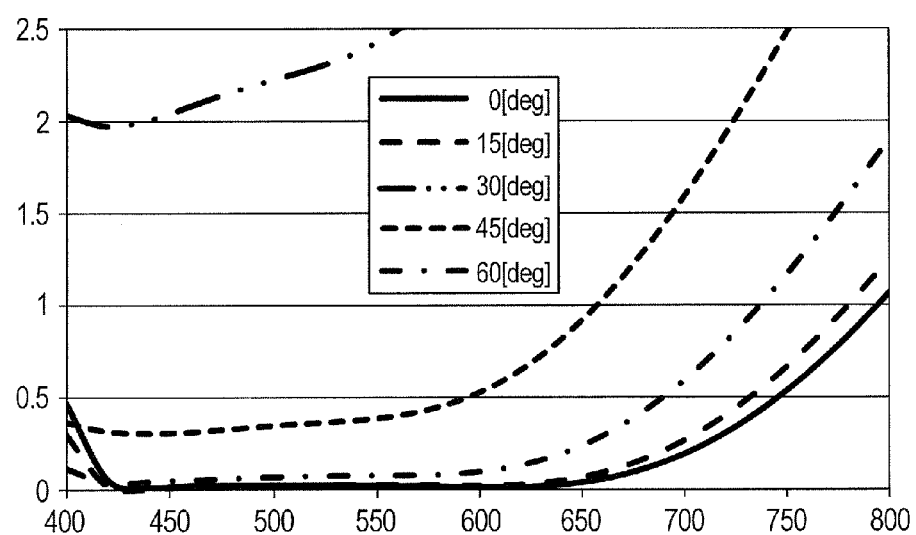
FIG. 3A is a graph showing spectral characteristics of the reflectivity of the anti-reflection film of Example 1.
Figure 3B:
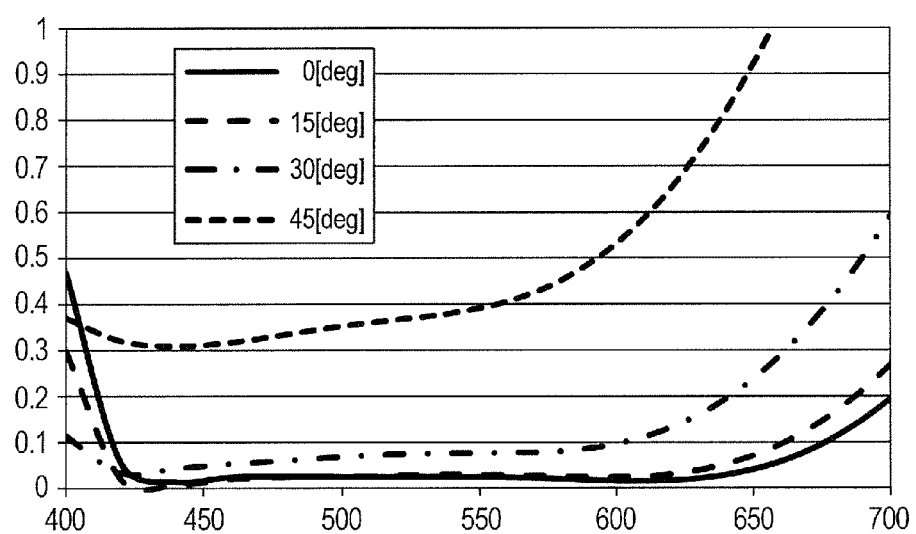
FIG. 3B is a graph showing spectral characteristics of the reflectivity of the anti-reflection film of Example 1.

FIG. 3A is a graph showing wavelength characteristics of the reflectivity of the anti-reflection film 10 of Example 1. FIG. 3B is an enlarged view of a part of FIG. 3A. Those figures show simulation results in a wavelength range of from 400 nm to 800 nm at incident angles of 0°, 15°, 30°, 45°, and 60°. The anti-reflection film has a reflectivity of 0.03% or less at an incident angle of 0° in a wavelength range of from 430 nm to 630 nm, and thus has very high performance. The anti-reflection film also has a reflectivity of 0.2% or less, and of 0.1% or less particularly in a wavelength range of from 430 nm to 600 nm, at an incident angle of 30°. The anti-reflection film 10 of Example 1 also has good angle characteristics.

Example 2

The anti-reflection film 10 of Example 2 has a structure in which seven layers of the first layer 1 to the seventh layer 7 are laminated on the substrate 8 made of glass having a refractive index of 1.85 (the refractive index and the optical thickness hereinafter refer to values at λ=550 nm). Table 2 shows design values of the refractive indices and optical thicknesses for the respective layers of the anti-reflection film of Example 2. As illustrated in FIG. 1, the multi-layer film 9 including the first layer 1 to the sixth layer 6 each formed of a dielectric thin film is disposed on the substrate 8. Those dielectric thin films formed by a vacuum vapor deposition method.

The seventh is a very-low-refractive-index layer (hollow particle-containing layer) in which the hollow particles 12 each formed of $MgF_2$ are arranged and the binder 13 is filled into a space between the particles, as illustrated in FIG. 2. The hollow particles having an average diameter of about 43 nm are laminated nearly in a close-packed state. The binder 13 mainly containing $MgF_2$ or $SiO_2$ is filled in the space between the particles. The seventh layer 7 has a refractive index of about 1.20. After the binder is applied, heating is performed in an oven, and thus more enhanced strength is achieved.

Figure 4A:
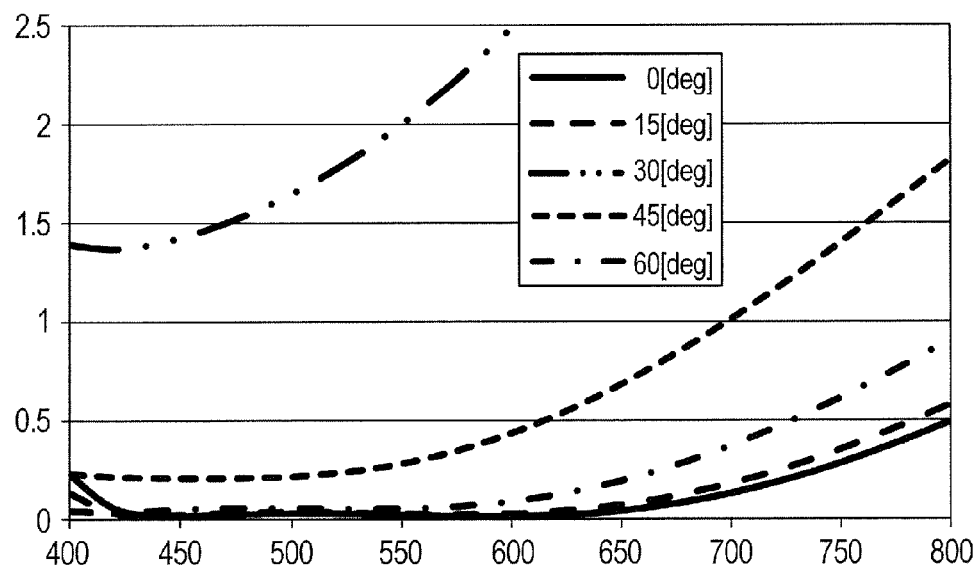
FIG. 4A is a graph showing spectral characteristics of the reflectivity of the anti-reflection film of Example 2.
Figure 4B:
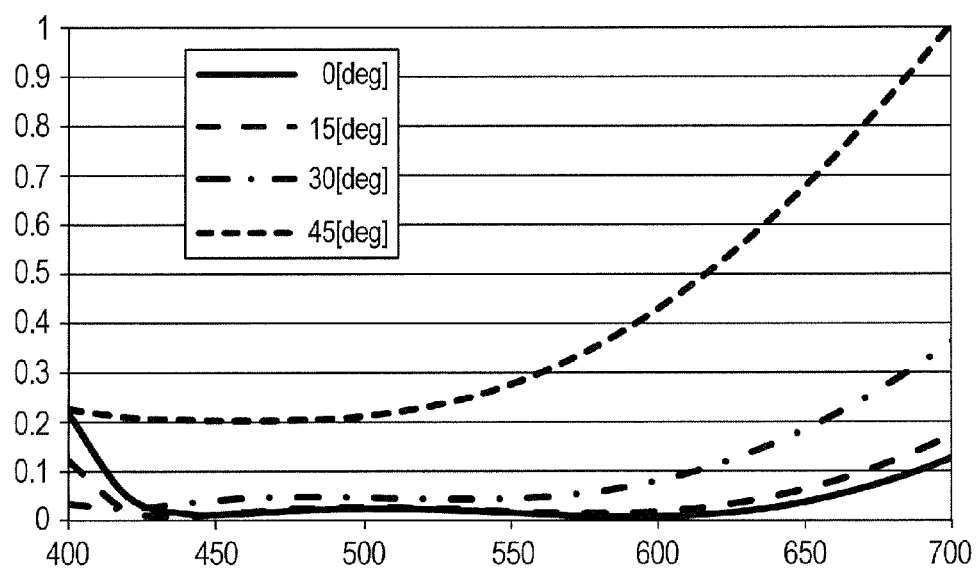
FIG. 4B is a graph showing spectral characteristics of the reflectivity of the anti-reflection film of Example 2.

FIG. 4A is a graph showing wavelength characteristics of the reflectivity of the anti-reflection film 10 of Example 2. FIG. 4B is an enlarged view of a part of FIG. 4A. Those figures show simulation results in a wavelength range of from 400 nm to 800 nm at incident angles of 0°, 30°, 45°, and 60°. The anti-reflection film has a reflectivity of 0.05% or less at an incident angle of 0° in a wavelength range of from 430 nm to 650 nm, and thus has very high performance. The anti-reflection film also has a reflectivity of 0.2% or less at an incident angle of 30°. The anti-reflection film 10 of Example 2 also has good angle characteristics.

Example 3

The anti-reflection film 10 of Example 3 has a structure in which seven layers of the first layer 1 to the seventh layer 7 are laminated on the substrate 8 made of glass having a refractive index of 1.52 (the refractive index and the optical thickness hereinafter refer to values at λ=550 nm). Table 3 shows design values of the refractive indices and optical thicknesses for the respective layers of the anti-reflection film of Example 3. As illustrated in FIG. 1, the multi-layer film 9 including the first layer 1 to the sixth layer 6 each formed of a dielectric thin film is disposed on the substrate 8. Those dielectric thin films are formed by a vacuum vapor deposition method.

The seventh layer is very-low-refractive-index layer (hollow particle containing layer) in which the hollow particles 12 each formed of $MgF_2$ are arranged and the binder 13 is filled into a space between the particles, as illustrated in FIG. 2. The hollow particles 12 have an average diameter of about 43 nm and are laminated nearly in a close-packed state. The binder 13 mainly containing $MgF_2$ or $SiO_2$ is filled in the space between the particles. The seventh layer 7 has a refractive index of about 1.20. After the binder is applied, heating is performed in an oven, and thus more enhanced strength is achieved.

Figure 5A:
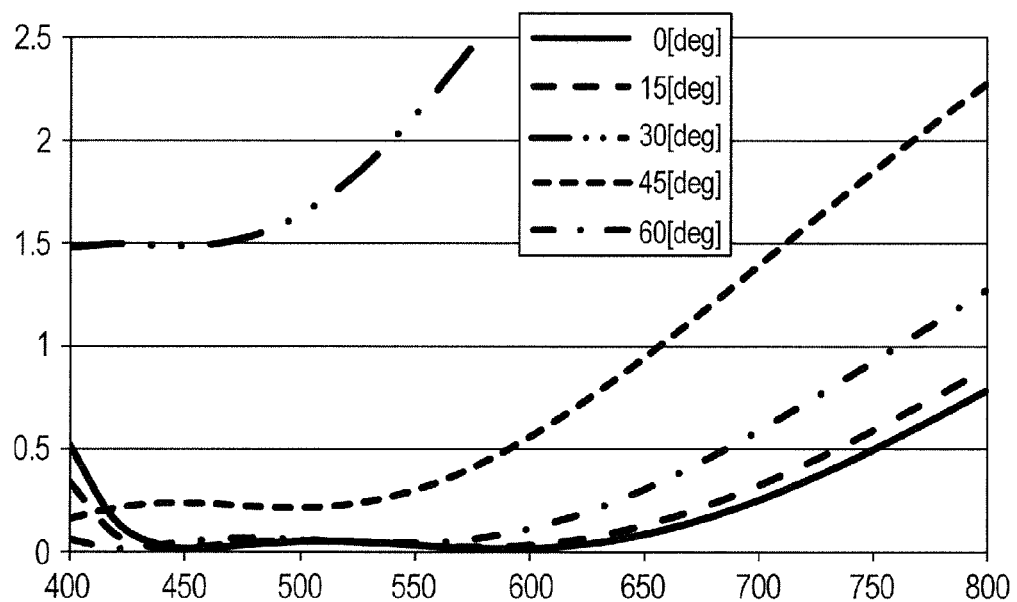
FIG. 5A is a graph showing spectral characteristics of the reflectivity of the anti-reflection film of Example 3.
Figure 5B:
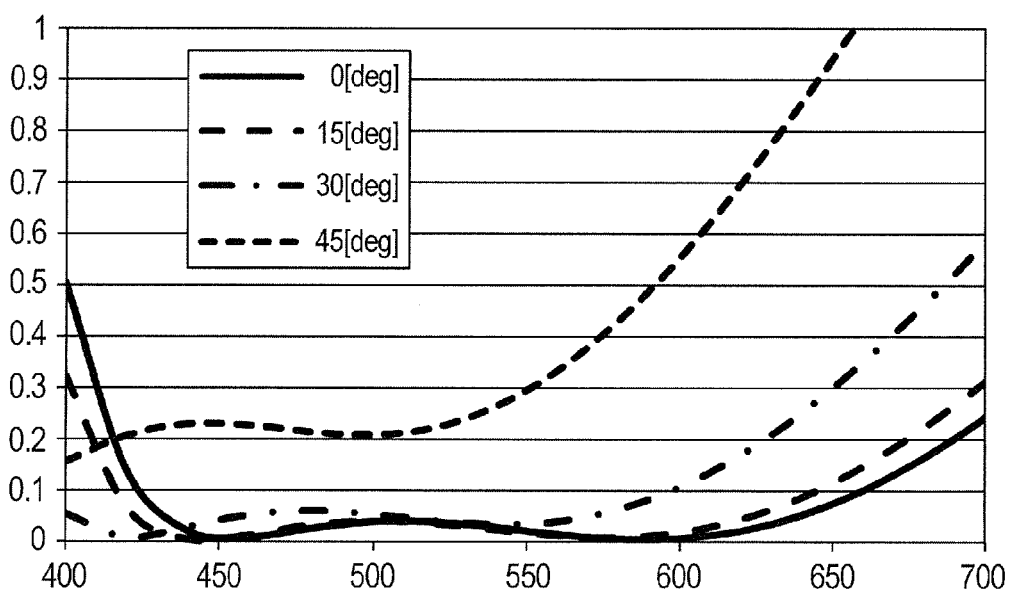
FIG. 5B is a graph showing spectral characteristics of the reflectivity of the anti-reflection film of Example 3.

FIG. 5A is graph showing wavelength characteristics of the reflectivity of the anti-reflection film of Example 3. FIG. 5B is an enlarged view of a part of FIG. 5A. Those figures show simulation results in a wavelength range of from 400 nm to 800 nm at incident angles of 0°, 15°, 30°, 45°, and 60°. The anti-reflection film has a reflectivity of 0.05% or less at an incident angle of 0° in a wavelength range of from 430 nm to 620 nm, and thus has very high performance. The anti-reflection film also has a reflectivity of 0.2% of less at an incident angle of 30°. The anti-reflection film 10 of Example 3 also has good angle characteristics.

Example 4

The anti-reflection film 10 of Example 4 has a structure in which seven layers of the first layer 1 to the seventh layer 7 are laminated on the substrate 8 made of glass having a refractive index of 1.73 (the refractive index and the optical thickness hereinafter refer to values at λ=550 nm). Table 4 shows design values of the refractive indices and optical thicknesses the respective layers of the anti-reflection film of Example 3. As illustrated in FIG. 1, the multi-layer film 9 including the first layer 1 to the sixth layer 6 each formed of a dielectric thin film is disposed on the substrate 8. Those dielectric thin films are formed by a vacuum vapor deposition method.

The seventh layer is a very-low-refractive-index layer (hollow particle-containing layer) in which the hollow particles 12 each formed of $MgF_2$ are arranged and the binder 13 is filled into a space between the particles, as illustrated in FIG. 2. The hollow particles 12 have an average diameter of about 43 nm and are laminated nearly in a close packed state. The binder 13 mainly containing $MgF_2$ is filled in the space between the particles. The seventh layer 7 has a refractive index of about 1.15. After the binder is applied, heating is performed in an oven, and thus more enhanced strength is achieved.

Figure 6A:
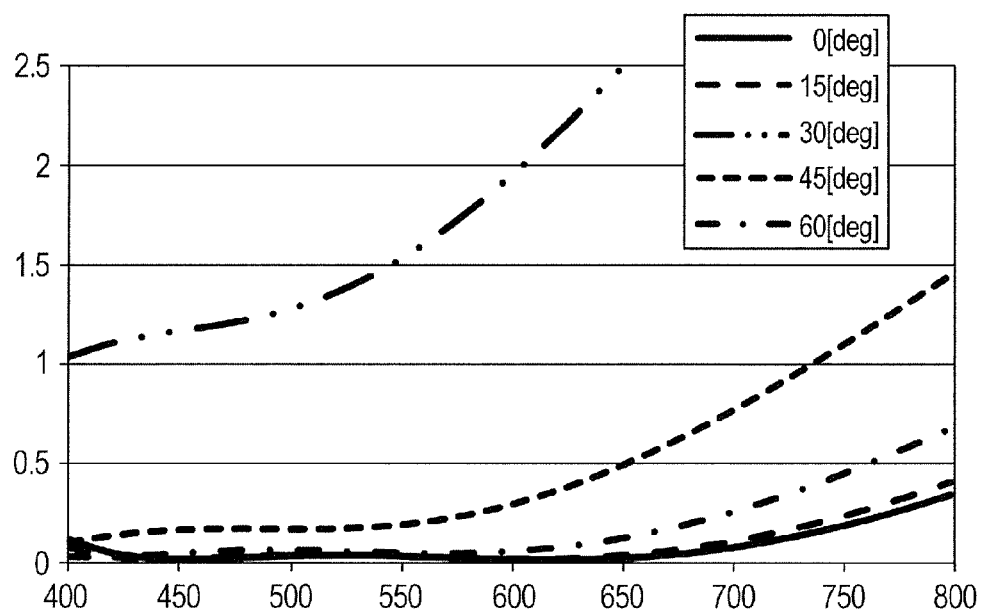
FIG. 6A is a graph showing spectral characteristics of the reflectivity of the anti-reflection film of Example 4.
Figure 6B:
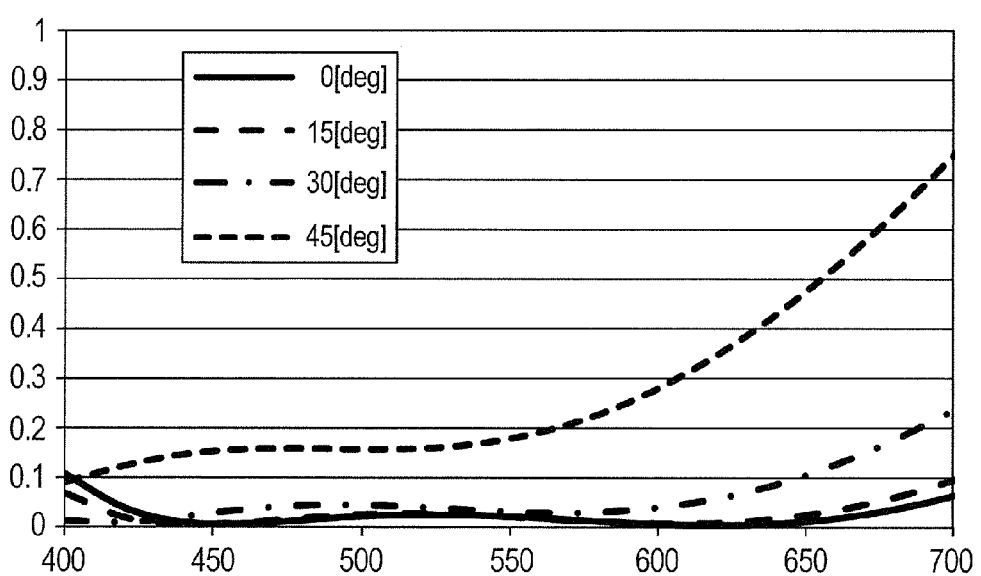
FIG. 6B is a graph showing spectral characteristics of the reflectivity of the anti-reflection film of Example 4.

FIG. 6A is a graph showing wavelength characteristics of the reflectivity of the anti-reflection film of Example 4. FIG. 6B is an enlarged view of a part of FIG. 6A. Those figures show simulation results in a wavelength range of from 400 nm to 800 nm at incident angles of 0°, 15°, 30°, 45°, and 60°. The anti-reflection film has a reflectivity of 0.02% or less at an incident angle of 0° in a wavelength range of from 430 nm to 650 nm, and thus has very high performance. The anti-reflection film also has a reflectivity of 0.1% or less at an incident angle of 30°. The anti-reflection film 10 of Example 4 also has good angle characteristics.

In the anti-reflection film of each of Examples 5 and 6 illustrated in FIG. 7, the refractive indices of the mediums for forming the first layer to the seventh layer are respectively defined as n1 to n7, and the optical thicknesses of the first layer to the seventh layer are respectively defined as d1 to d7.

In this case, the following conditional expressions are satisfied.

$n1=nM, 10 \leq d1 \leq 180$ $n2=nL, 5 \leq d2 \leq 90$ $n3=nM, 50 \leq d3 \leq 160$ $n4=nH, 10 \leq d4 \leq 45$ $n5=nM, 50 \leq d5 \leq 150$ $n6=nH, 5 \leq d6 \leq 65$ $1.1 \leq n7 \leq 1.3$ $130 \leq d7 \leq 160$ In Examples 5 and 6, the first layer 1 to the sixth layer 6 have refractive indices of nM, nL, nM, nH, nM, and nH, respectively. Examples 5 and 6 differ from Examples 1 to 4 in that the mediums for forming the first layer 1 to the sixth layer 6 have refractive indices of nM, nL, nM, nH, nM, and nH in this order from the substrate 8 side. In Examples 5 and 6, the refractive indices of the mediums for forming the second layer 2 and the fourth layer 4 are different from those in Examples 1 to 4.

Next, the anti-reflection film 10 of each of Examples 5 and 6 of the present invention is described.

Example 5

The anti-reflection film 10 of Example has a structure in which seven layers of the first layer 1 to the seventh layer 7 are laminated on the substrate 8 made of glass having a refractive index of 1.81 (the refractive index and the optical thickness hereinafter refer to values at λ=550 nm).

Table 5 shows design values of the refractive indices and optical thicknesses of the anti-reflection film of Example 5. As illustrated in FIG. 7, the multi-layer film 9 including the first layer 1 to the sixth layer 6 each formed of a dielectric thin film is disposed on the substrate 8. Those dielectric thin films are formed by a vacuum vapor deposition method.

The seventh layer 7 is a very-low-refractive-index layer (hollow particle-containing layer) in which the hollow particles 12 each formed of silica are arranged and the binder 13 is filled into a space between the particles, as illustrated in FIG. 2. The hollow particles 12 have an average diameter of about 30 nm and are laminated nearly in a close-packed state. The binder 13 mainly containing silica is filled in the space between the particles. The seventh layer 7 has a refractive index of about 1.25. After the binder is applied, heating is performed in an oven, and thus more-enhanced strength is achieved.

Figure 8A:
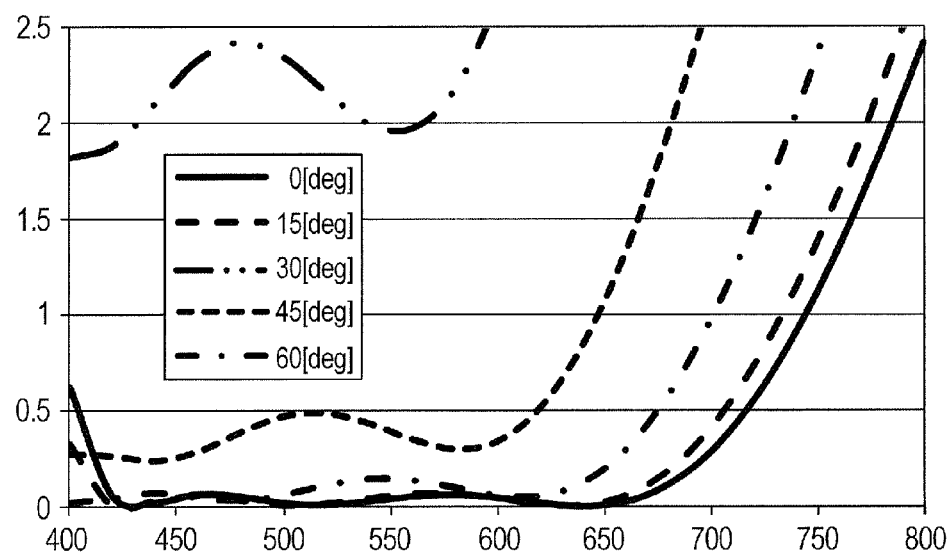
FIG. 8A is a graph showing spectral characteristics of the reflectivity of the anti-reflection film of Example 5.
Figure 8B:
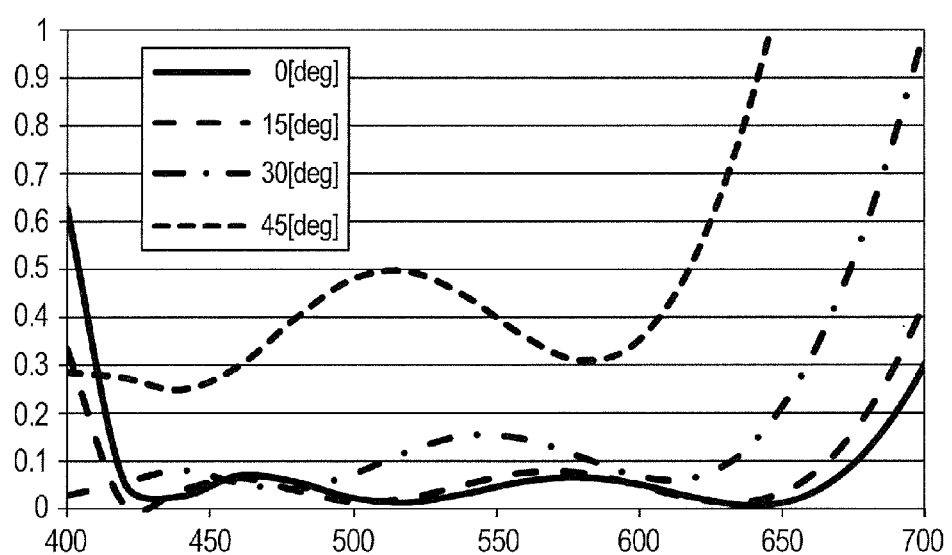
FIG. 8B is a graph showing spectral characteristics of the reflectivity of the anti-reflection film of Example 5.

FIG. 8A is a graph showing wavelength characteristics of the reflectivity of the anti-reflection film of Example 5. FIG. 8B is an enlarged view of a part of FIG. 8A.

Those figures snow simulation results in a wavelength range of from 400 nm to 800 nm at incident angles of 0°, 15°, 30°, 45°, and 60°. The anti-reflection film has a reflectivity of 0.08% or less at an incident angle of 0° in a wavelength range of from 430 nm to 650 nm, and thus has very high performance. The anti-reflection film also has a reflectivity of 0.2% or less at an incident angle of 30°. The anti-reflection film 10 of Example 5 also has good angle characteristics.

Example 6

The anti-reflection film 10 of Example 6 has structure in which seven layers of the first layer 1 to the seventh layer 7 are laminated on the substrate 8 made of glass having a refractive index of 1.52 (the refractive index and the optical thickness hereinafter refer to values at λ=550 nm). Table 6 shows design values of the refractive indices and optical thicknesses of the anti-reflection film of Example 6. As illustrated in FIG. 7, the multi-layer film 9 including the first layer 1 to the sixth layer 6 each formed of a dielectric thin film is disposed on the substrate 8. Those dielectric thin films are formed by a vacuum vapor deposition method.

The seventh layer 7 is a very-low-refractive-index layer (hollow particle-containing layer) in which the hollow particles 12 each formed of silica are arranged and the binder 13 is filled into a space between the particles, as illustrated in FIG. 2. The hollow particles 12 have an average diameter of about 30 nm and are laminated nearly in a close-packed state. The binder 13 mainly containing silica is filled in the space between the particles. The seventh layer 7 has a refractive index of about 1.25. After the binder is applied, heating is performed in an oven, and thus more enhanced strength is achieved.

Figure 9A:
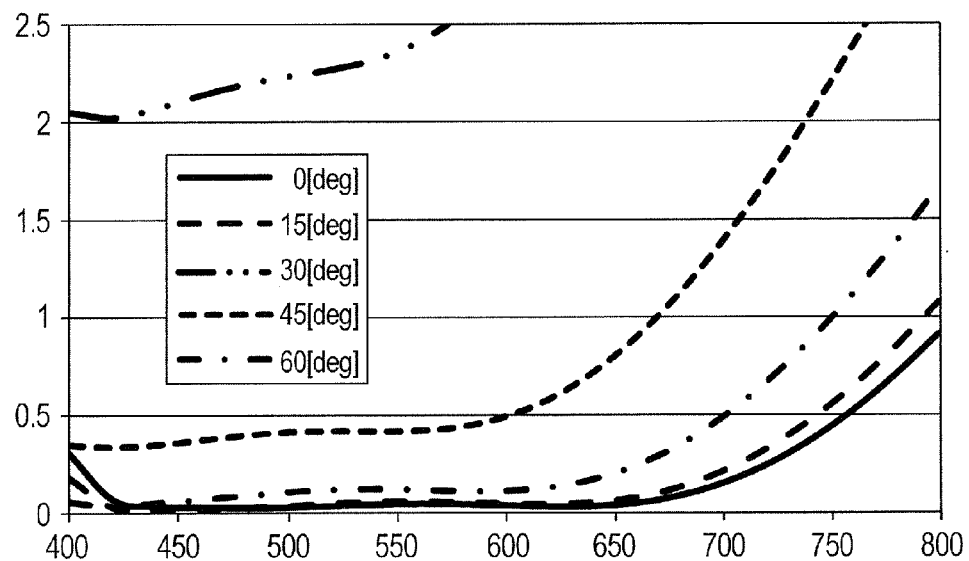
FIG. 9A is a graph showing spectral characteristics of the reflectivity of the anti-reflection film of Example 6.
Figure 9B:
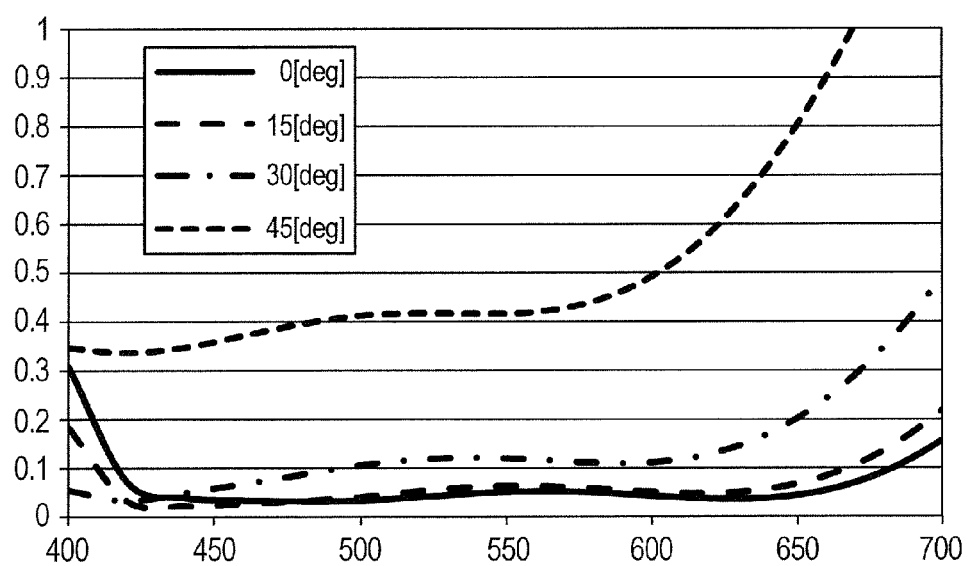
FIG. 9B is a graph showing spectral characteristics of the reflectivity of the anti-reflection film of Example 6.

FIG. 9A is a graph showing wavelength characteristics of the reflectivity of the anti-reflection film of Example 6. FIG. 9B is an enlarged view of a part of FIG. 9A. Those figures show simulation results in a wavelength range of from 400 nm to 800 nm at incident angles of 0°, 15°, 30°, 45°, and 60°. The anti-reflection film has a reflectivity of 0.05% or less at an incident angle of 0' in a wavelength range of from 430 nm to 650 nm, and thus has very high performance. The anti-reflection film also has a reflectivity of 0.2% or less at an incident angle of 30°. The anti-reflection film 10 of Example 6 also has good angle characteristics.

Examples described above are merely representative examples, and each of Examples may be variously modified or altered in the practice of the present invention.

Comparative Example 1

Table 7 shows values of the refractive indices and optical thicknesses for respective layers of an anti-reflection film of Comparative Example 1 to be compared to the anti-reflection film of the present invention. In Comparative Example 1, the first layer to the seventh layer are formed by the same method as in Examples described above.

Figure 10A:
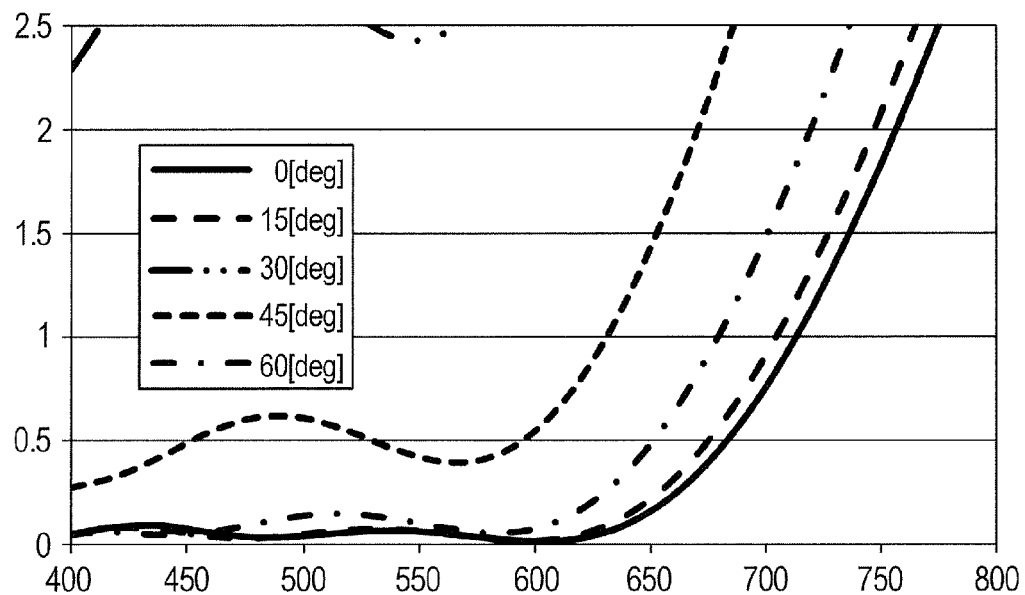
FIG. 10A is a graph showing spectral characteristics of the reflectivity of an anti-reflection film of Comparative Example 1.
Figure 10B:
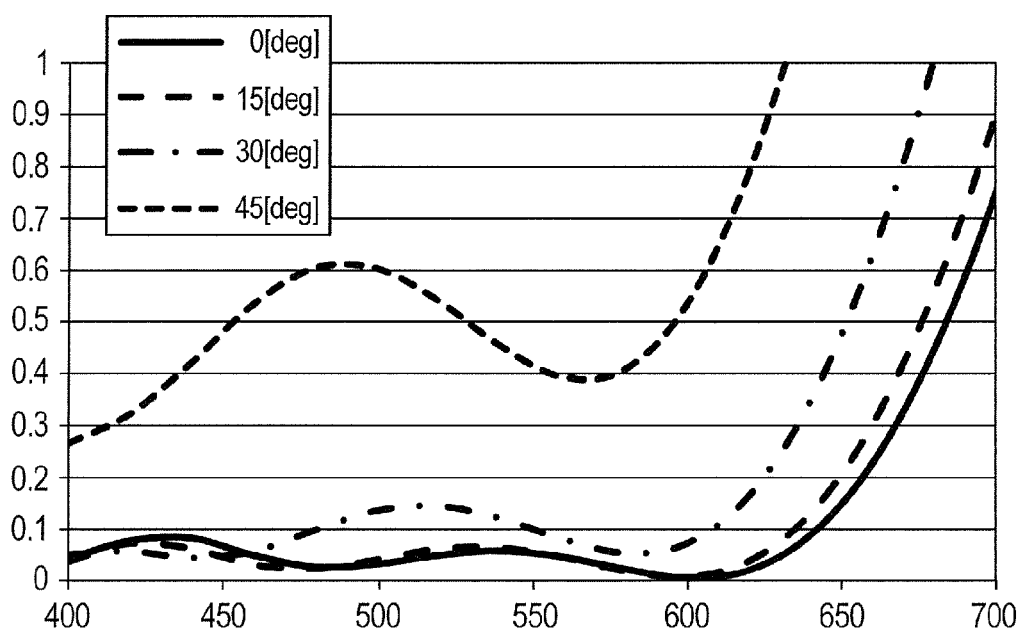
FIG. 10B is a graph showing spectral characteristics of the reflectivity of the anti-reflection film of Comparative Example 1.

FIG. 10A is a graph showing wavelength characteristics of the reflectivity of the anti-reflection film of Comparative Example 1. FIG. 10B is an enlarged view of a part of FIG. 10A. FIGS. 10A and 10B are graphs showing results of calculating a spectral reflectivity under the same conditions as in Examples described above. Those figures show simulation results in a wavelength range of from 400 nm to 800 nm at incident angles of 0°, 15°, 30°, 45°, and 60°. The reflectivity at an incident angle of 0° is about 0.08% at a wavelength of 430 nm, and exceeds 0.1% at a wavelength of 650 nm. The reflectivity at an incident angle of 30° is higher than 0.4% at a wavelength of 650 nm.

Comparative Example 2

Table 8 shows values of the refractive indices and optical thicknesses for respective layers an anti-reflection film of Comparative Example 2 to be compared to the anti-reflection film of the present invention. In Comparative Example 2, the first layer to the seventh layer are formed by the same method as in Examples described above.

Figure 11A:
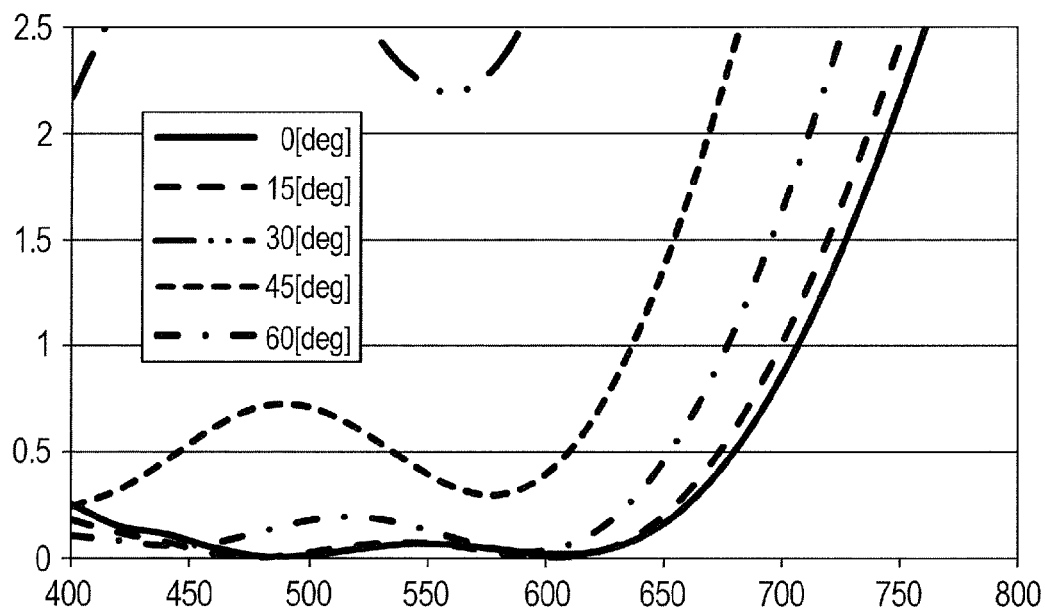
FIG. 11A is a graph showing spectral characteristics of the reflectivity of an anti-reflection film of Comparative Example 2.
Figure 11B:
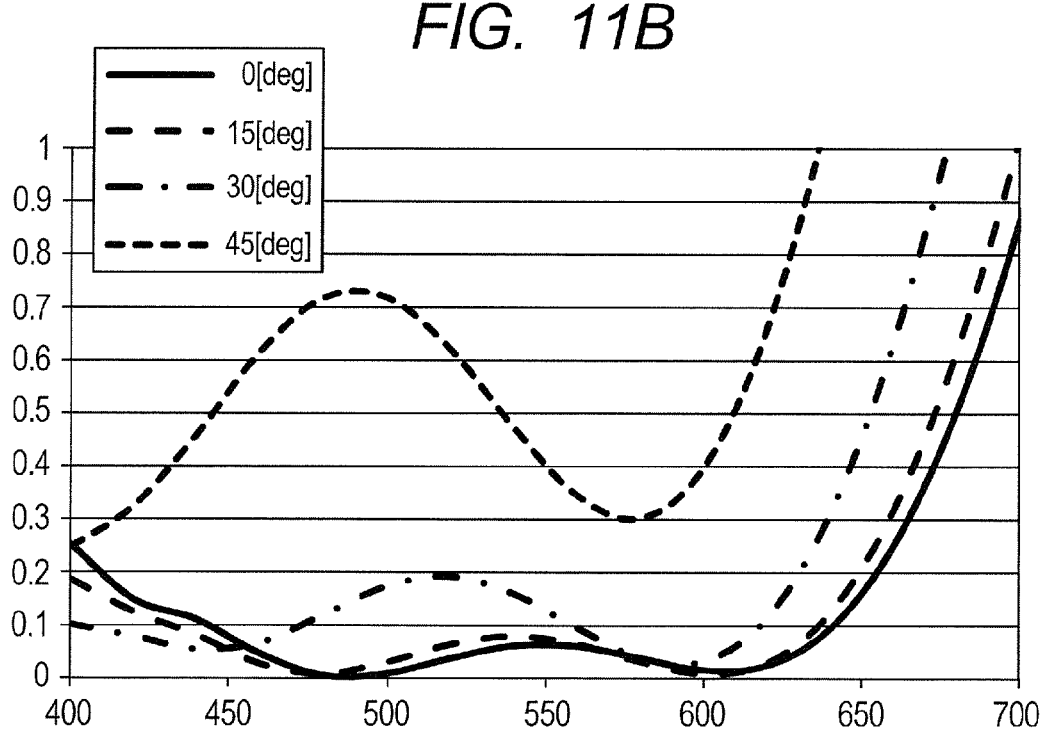
FIG. 11B is a graph showing spectral characteristics of the reflectivity of the anti-reflection film of Comparative Example 2.

FIG. 11A is a graph showing wavelength characteristics of the reflectivity of the anti-reflection film of Comparative Example 2. FIG. 11B is an enlarged view of a part of FIG. 11A. FIGS. 11A and 11B are graphs showing results of calculating a spectral reflectivity under the same conditions as in Examples described above. Those figures show simulation results in a wavelength range of from 400 nm to 800 nm at incident angles of 0°, 15°, 30°, 45°, and 60°.

The reflectivity at an incident angle of 0° exceeds 0.1% at a wavelength of 430 nm, and exceeds 0.15% at a wavelength of 650 nm. The reflectivity at an incident angle of 30° is as high as about 0.2% at a wavelength of 520 nm, and is higher than 0.4% at a wavelength of 650 nm.

According to present invention, high reflection preventing performance of a reflectivity of 0.05% or less at a wavelength of 550 nm and a reflectivity of 0.3% or less at a wavelength of 700 nm is achieved in the configuration using as the uppermost layer the low-refractive-index layer having a refractive index of from 1.15 to 1.3, as described above. Thus, an anti-reflection film capable of effectively reducing ghost and flare can be obtained.

An critical element of the present invention includes the anti-reflection film provided on the surface of a lens, a filter, or the like. In addition, an optical system of the present invention, such as an image capturing lens, a finder system, an observation system, or a projection optical system, includes anti-reflection film provided on an optical surface.

TABLE 1

|  | Refractive index (550 nm) | Optical thickness |
| --- | --- | --- |
| Seventh layer | 1.25 | 148.3 |
| Sixth layer | 2.12 | 30.7 |
| Fifth layer | 1.63 | 53.9 |
| Fourth layer | 1.46 | 27.7 |
| Third layer | 1.63 | 16.0 |
| Second layer | 2.12 | 41.1 |
| First layer | 1.63 | 157.2 |
| Substrate layer | 1.52 | |

TABLE 2

| | Refractive index (550 nm) | Optical thickness |
|---|---|---|
| Seventh layer | 1.20 | 147.2 |
| Sixth layer | 2.12 | 13.6 |
| Fifth layer | 1.63 | 50.7 |
| Fourth layer | 1.46 | 44.1 |
| Third layer | 1.63 | 20.8 |
| Second layer | 2.12 | 39.0 |
| First layer | 1.63 | 34.4 |
| Substrate layer | 1.85 | |

TABLE 3

| | Refractive index (550 nm) | Optical thickness |
|---|---|---|
| Seventh layer | 1.20 | 145.1 |
| Sixth layer | 1.63 | 56.3 |
| Fifth layer | 1.46 | 12.0 |
| Fourth layer | 1.38 | 41.2 |
| Third layer | 1.46 | 13.3 |
| Second layer | 1.63 | 75.6 |
| First layer | 1.46 | 10.7 |
| Substrate layer | 1.52 | |

TABLE 4

| | Refractive index (550 nm) | Optical thickness |
|---|---|---|
| Seventh layer | 1.15 | 135.0 |
| Sixth layer | 2.12 | 10.0 |
| Fifth layer | 1.46 | 7.0 |
| Fourth layer | 1.38 | 74.8 |
| Third layer | 1.46 | 7.0 |
| Second layer | 2.12 | 18.2 |
| First layer | 1.46 | 35.9 |
| Substrate layer | 1.73 | |

TABLE 5

| | Refractive index (550 nm) | Optical thickness |
|---|---|---|
| Seventh layer | 1.25 | 136.5 |
| Sixth layer | 2.12 | 14.0 |
| Fifth layer | 1.63 | 113.1 |
| Fourth layer | 2.12 | 14.0 |
| Third layer | 1.63 | 149.5 |
| Second layer | 1.46 | 80.8 |
| First layer | 1.63 | 144.4 |
| Substrate layer | 1.81 | |

TABLE 6

| | Refractive index (550 nm) | Optical thickness |
|---|---|---|
| Seventh layer | 1.25 | 144.7 |
| Sixth layer | 2.12 | 20.0 |
| Fifth layer | 1.63 | 129.8 |
| Fourth layer | 2.12 | 28.5 |
| Third layer | 1.63 | 146.8 |
| Second layer | 1.46 | 9.8 |
| First layer | 1.63 | 10.0 |
| Substrate layer | 1.52 | |

TABLE 7

| | Refractive index (550 nm) | Optical thickness |
|---|---|---|
| Seventh layer | 1.27 | 123.1 |
| Sixth layer | 2.05 | 37.9 |
| Fifth layer | 1.38 | 20.9 |
| Fourth layer | 2.05 | 235.9 |
| Third layer | 1.38 | 32.9 |
| Second layer | 2.05 | 47.8 |
| First layer | 1.65 | 75 |
| Substrate layer | 1.79 | |

TABLE 8

| | Refractive index (550 nm) | Optical thickness |
|---|---|---|
| Seventh layer | 1.27 | 123.1 |
| Sixth layer | 2.05 | 32.5 |
| Fifth layer | 1.38 | 18.8 |
| Fourth layer | 2.05 | 245 |
| Third layer | 1.38 | 37.5 |
| Second layer | 2.05 | 37.5 |
| First layer | 1.65 | 100 |
| Substrate layer | 1.79 | |

While the present invention has been described with reference to exemplary embodiments, it is to be understood that the invention is not limited to the disclosed exemplary embodiments. The scope of the following claims is to accorded the broadest interpretation so as to encompass all such modifications and equivalent structures and functions.

This application claims the benefit of Japanese Patent Application No. 2014-081827, filed Apr. 11, 2014, which is hereby incorporated by reference herein in its entirety.

What is claimed is:

1. An optical element comprising:
a substrate; and
an anti-reflection film consisting of a first layer to a seventh layer that are laminated in order from the substrate,
wherein the first layer to a sixth layer are formed of three kinds of mediums having different refractive indices from one another, and
wherein, when refractive indices of the three kinds of mediums at a wavelength of 550 nm are defined as nL, nM, and nH, and a refractive index of the seventh layer at a wavelength of 550 nm is defined as n7, a layer formed of a medium having the refractive index of nL and a layer formed of the medium having the refractive index of nH are spaced away from each other, and the following conditional expressions are satisfied:

$1.35 \leq nL \leq 1.50$ $1.40 \leq nM \leq 1.65$ $1.6 \leq nH \leq 2.2$ $nL < nM < nH$ $1.1 \leq n7 \leq 1.3$.

2. An optical element according to claim 1, wherein, when the refractive indices of the mediums for forming the first layer to the sixth layer at a wavelength of 550 nm are respectively defined as n1 to n6 and optical thicknesses of the first layer to the seventh layer are respectively defined as d1 (nm) to d7 (nm), the following conditional expressions are satisfied:

n1=nM, 10≤d1≤180 n2=nH, 5≤d2≤80 n3=nM, 5≤d3≤95 n4=nL, 20≤d4≤100 n5=nM, 5≤d5≤75 n6=nH, 5≤d6≤65

130≤d7≤160.

3. An optical element according to claim 1, wherein, when the refractive indices of the mediums for forming the first layer to the sixth layer at a wavelength of 550 nm are respectively defined as n1 to n6 and optical thicknesses of the first layer to the seventh layer are respectively defined as d1 (nm) to d7 (nm), the following conditional expressions are satisfied:

n1=nM, 10≤d1≤180 n2=nL, 5≤d2≤90 n3=nM, 50≤d3≤160 n4=nH, 10≤d4≤45 n5=nM, 50≤d5≤150 n6=nH, 5≤d6≤65

130≤d7≤160.

4. An optical element according to claim 1, wherein the seventh layer comprises a plurality of hollow particles and a binder filled into a space between the hollow particles.

5. An optical element according to claim 4, wherein the hollow particles each comprise hollow silica.

6. An optical element according to claim 4, wherein the binder contains as a main component $SiO_2$.

7. An optical system, comprising the optical element of claim 1.

8. An optical element according to claim 1, wherein the first layer is formed of a medium having the refractive index of nM, and the sixth layer is formed of a medium having the refractive index of nH.

9. An optical element according to claim 1, wherein the first layer is formed of a medium having the refractive index of nM.

10. An optical element according to claim 1, wherein the sixth layer is formed of a medium having the refractive index of nH.

11. An optical element according to claim 1, wherein the anti-reflection film has a reflectivity of 0.08% or less at an incident angle of 0° in a wavelength range of from 430 nm to 650 nm.

* * * * *